INVENTOR
T. C. CAMPBELL
BY
ATTORNEY

April 6, 1948.  T. C. CAMPBELL  2,438,898
RADIO OBJECT LOCATING SYSTEM TRAINING DEVICE
Filed Dec. 6, 1943   4 Sheets-Sheet 2

INVENTOR
T. C. CAMPBELL
BY
ATTORNEY

April 6, 1948. T. C. CAMPBELL 2,438,898
RADIO OBJECT LOCATING SYSTEM TRAINING DEVICE
Filed Dec. 6, 1943 4 Sheets-Sheet 3

INVENTOR
T. C. CAMPBELL
BY
ATTORNEY

Patented Apr. 6, 1948

2,438,898

UNITED STATES PATENT OFFICE 2,438,898

RADIO OBJECT LOCATING SYSTEM TRAINING DEVICE

Thaddeus C. Campbell, Rutherford, N. J., assignor to Bell Telephone Laboratories, Incorporated, New York, N. Y., a corporation of New York Application December 6, 1943, Serial No. 513,041

11 Claims. (Cl. 35—10)

This invention relates to object-locating systems and particularly to systems of this character which simulate the courses and movements of objects in space.

The objects of the invention are to simulate at will any desired course of an object in space; to utilize mechanical members for generating a course in which range and angular dimensions are varied in any desired manner; to utilize the movement of these mechanical members to produce electrical quantities which vary in accordance with instant values of the range and angular location of said object; to utilize these electrical quantities for training students in the art of locating moving objects; and in other respects to obtain improvements in systems of this general character.

Object-locating systems have been devised for following or tracking an airplane or other object moving along a variable course in space. In one such system directive radio impulses are transmitted from the point of observation to the airplane from which they return as echo impulses. These returning impulses are received and utilized to form on a screen before the operator moving images which serve as a continuous representation of the range and angle, either azimuth or elevation, of the moving airplane. The operator is also provided with means, such as hand wheels, which he manipulates to follow or otherwise control these changing images. If he manipulates his range wheel accurately, its position at any instant is a measure of the range of the moving airplane, and the same is true with respect to the hand wheels with which he follows the azimuth and elevation angles. Since the accuracy of the information obtained from these object-locating systems depends largely upon the proficiency of the operators, it is desirable to give the operators a preliminary course of training under conditions which simulate as closely as possible the actual conditions which they will ultimately encounter in operating the object-locating systems.

Accordingly, the present invention contemplates a training system in which a flight generating mechanism comprising in large measure mechanical members operated by an electric motor or other suitable driving means, serves to produce on a small scale courses of flight which simulate the movement of objects, such as airplanes, along courses in space bearing any desired relationship to the chosen point of observation. More specifically, the generating mechanism comprises a driving shaft having its axis disposed in a first coordinate direction, means for translating said shaft in either or both of the remaining two coordinate directions to occupy desired positions in space, a movable element mounted on said shaft and driven along the length thereof to simulate the movement of the imaginary object in space, together with devices operated by said movable element to indicate the varying values of the range and angular dimensions of the imaginary object with respect to the point of observation. The movement of said element from one end of the driving shaft to the other represents the fully observed course of the imaginary object in space, and the speed with which the driving shaft is operated may be varied to vary the speed of the simulated flight. Since the driving shaft of the device is capable of translation in either of two coordinate directions, it is possible to select courses having any desired elevation angle and any desired rate of change of range and azimuth angle. Thus a wide variety of simulated courses is available for training the student.

According to a feature of the invention the movable element on the driving shaft is interconnected by mechanical linkages with electrical devices such as condensers and potentiometers which respond to the movable element to produce electrical quantities representing the instant values of the range of angular dimensions of the imaginary object in space. These electrical quantities are utilized to simulate at the student's position the same effects he would experience if he were operating an object-locating system to follow a real object in space.

These and other features of the invention will be described more fully in the following detailed specification.

In the drawing accompanying the specification:

Since the purpose of a training system, of which the course generator is a part, is to prepare the student to operate an object-locating system under actual conditions varying over wide ranges, an effort has been made to give the instructor a choice of imaginary courses simulating all of the actual conditions, such as changing range, azimuth, and elevation angles, which the student is likely to encounter when he is later entrusted with the manipulation of a locating system. To this end the instructor may preselect courses for which the rate of change of the range or the angular relation is relatively small or relatively large as well as courses having desired intermediate values. Also the instructor is provided with means for varying the speed with which the imaginary object moves along the simulated course.

In general, the course generator disclosed herein, once set by the instructor, will describe a straight-line course of flight which is perpendicular to the bisecting line drawn through the point of observation and which has a uniform elevation throughout its length. However, the instructor may, if he so desires, introduce variations in the dimensions above mentioned during the generation of the course. That is to say, he can, by manipulating his control devices, while the course generator is in operation, vary at will the rate of change of the range and azimuth angle and also the elevation angle.

Figure 9:
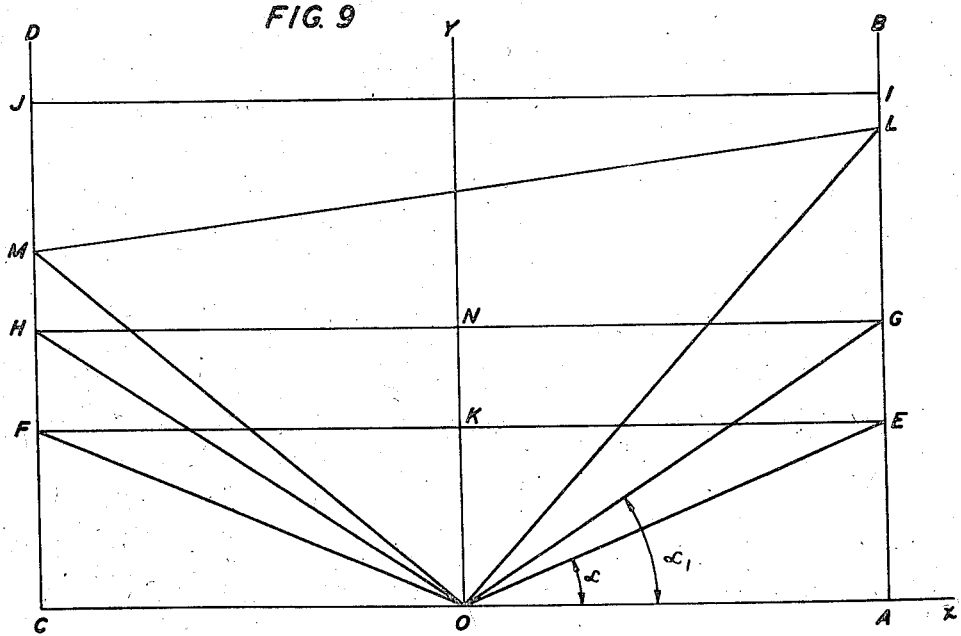
Fig. 9 is a chart illustrating the simulated courses.

Referring to Fig. 9, which illustrates the courses available to the instructor, it is assumed that O is the student's point of observation. This point of observation is located at the intersection of line OX and the perpendicular line OY, the line OX also being perpendicular to the boundary lines AB and CD which mark the beginning and ending of all courses. As above noted the generator, if undisturbed during its operation, will generate course lines, such as lines EF and GH, which are perpendicular to the line OY. If the generator is set for zero elevation, all courses generated lie in the plane determined by lines OX and OY which also includes the point of observation O, likewise assumed to be at zero elevation. For other fixed values of elevation the generated courses will lie in planes parallel to the plane OX—OY. Considering the parallel courses EF, GH, etc., the length of which may be assumed to be 50,000 yards, it will be noted that the rates of change of range and azimuth angle differ widely depending on the location of the course with respect to the point of observation. If the range is taken as the distance from the point O to the point of the imaginary object on the course, such as the distance OE when the object is at the starting point E of the course EF, and if the azimuth angle is taken as the angle α formed between the range line OE and the axis OX, the rate of change of these dimensions increases rapidly as the course line approaches the axis OX. For example, the rate of change and azimuth is much smaller for the course line IJ than it is for the course line EF and intermediate rates of change may be had by choosing intermediate courses. During the first half of any chosen course the range changes in one sense until the mid-point is reached at the line OY, and during the second half of the course it changes in the opposite sense. For example, the range of the course starting at the point E changes at a decreasing rate for constant speed of flight until the mid-point K is reached whereupon the range changes at an increasing rate from the point K to the point F of the flight. The course line LM illustrates the effect of the instructor's control during flight. It is assumed that during the generation of the course from the point L to the point M the instructor introduces with his manual control devices a uniform change in the range and azimuth dimensions, thus producing a course which steadily approaches the axis OX. The elevation angle, which is not illustrated in Fig. 9, is chosen at any desired value by the instructor when he sets the generator and will remain constant throughout the course unless changed by the instructor. The manner in which he controls these dimensions will be explained more fully in connection with the structure and operation of the course generator.

Figure 1:
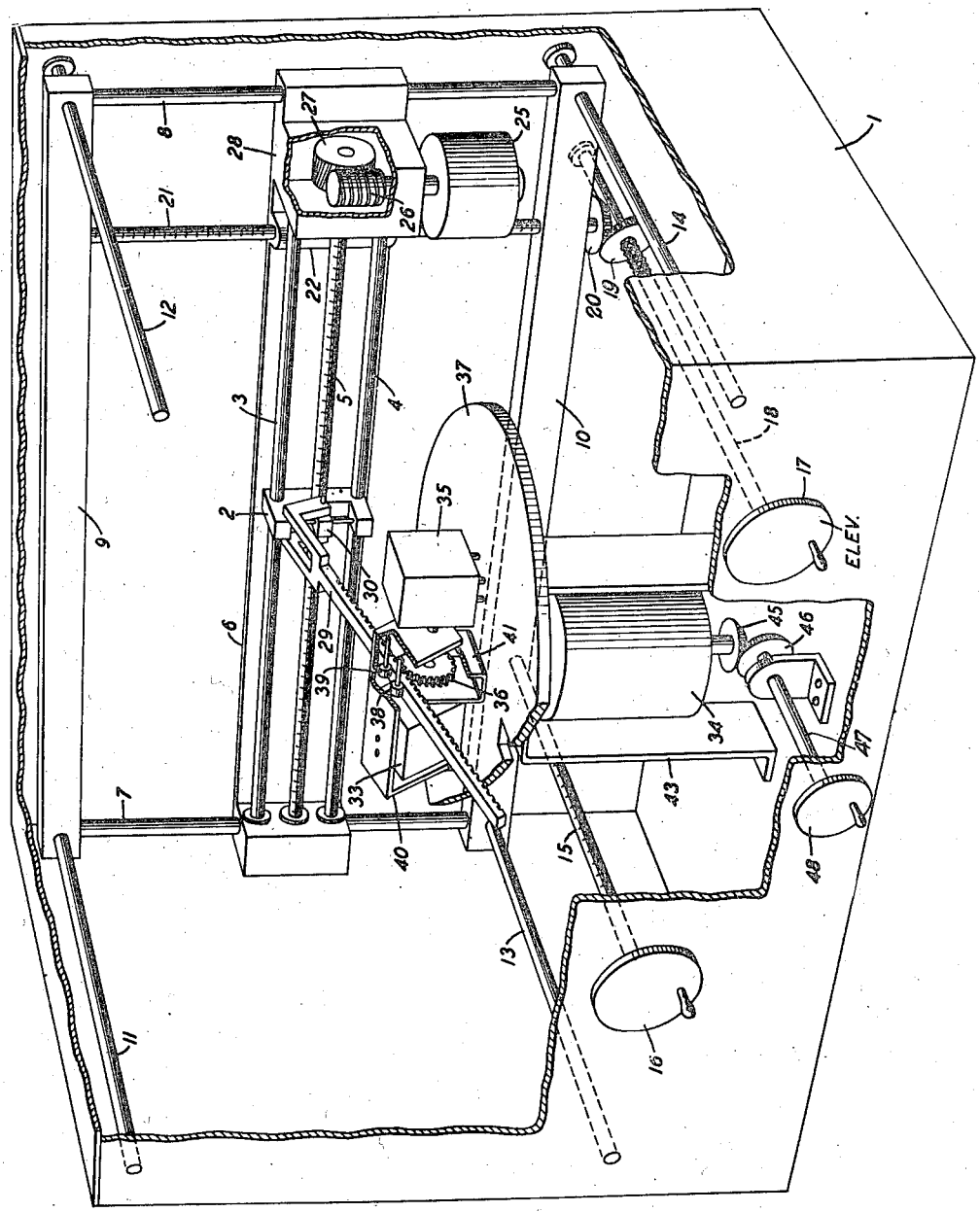
Fig. 1 is a perspective view of the course generator.
Figure 2:
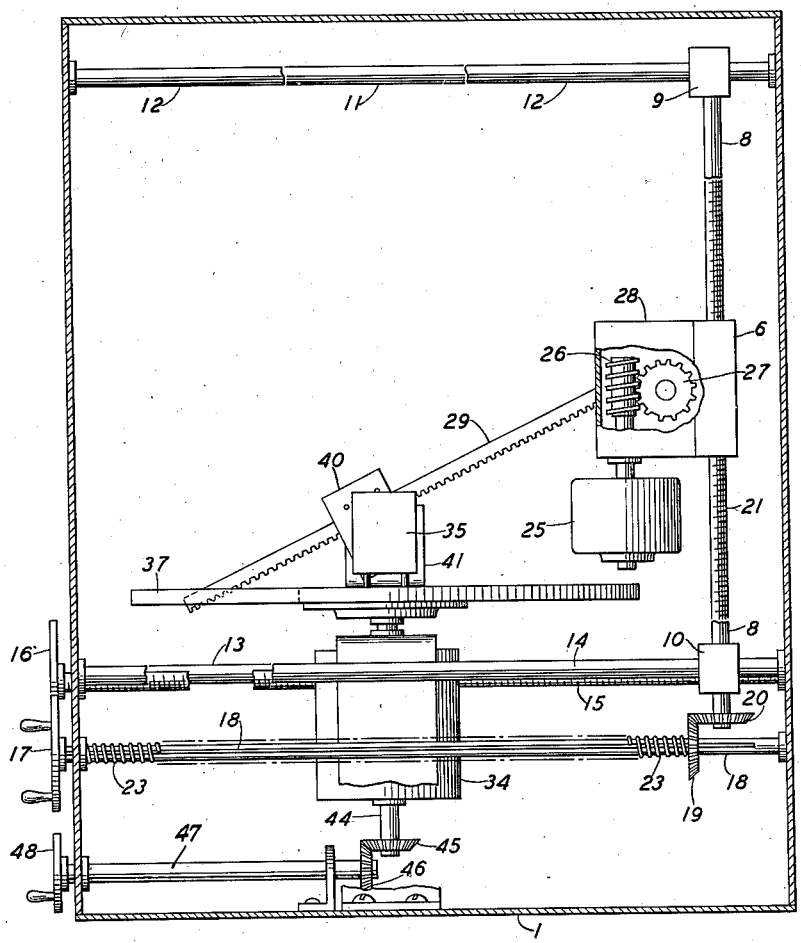
Fig. 2 is a side view of the generator.
Figure 5:
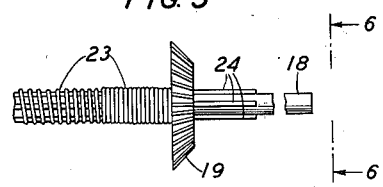
Figs. 5 and 6 are details of the elevation control mechanism.
Figure 6:
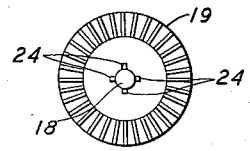
Figure 3:
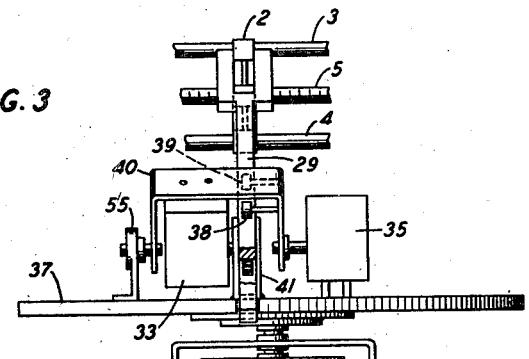
Fig. 3 is a detailed view showing the azimuth table and associated parts.
Figure 7:
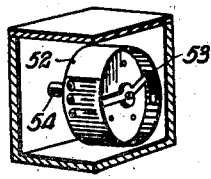
Fig. 7 is a variable resistor.
Figure 4:
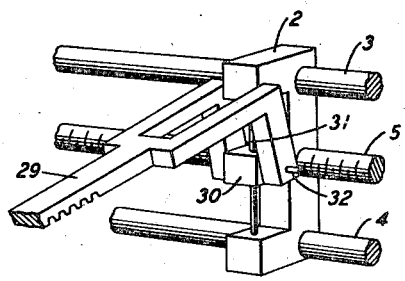
Fig. 4 is an enlarged perspective view of the movable head which traces the course.
Figure 10:
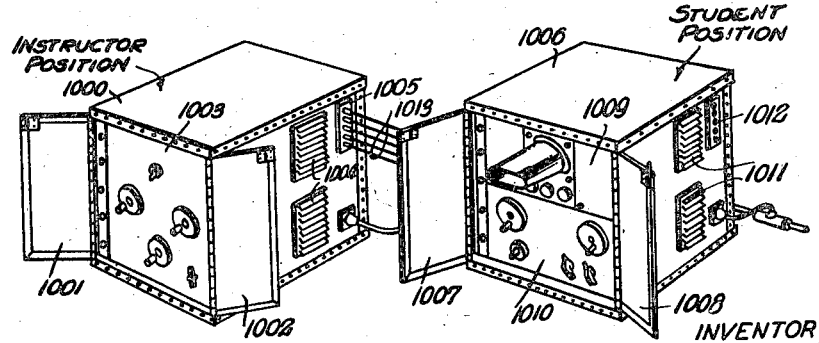
Fig. 10 illustrates the instructor's apparatus cabinet and one student's apparatus cabinet as they would be set up for training purposes.

The apparatus at the instructor's position is mounted in an apparatus cabinet 1000, shown in Fig. 10, having front closure doors 1001 and 1002 and a control panel 1003. The sides of the cabinet are provided with ventilation slots 1004 and with cable jacks, such as 1005, by which the instructor's cabinet may be connected with one or more students' positions. The apparatus at a student's position is mounted in an apparatus cabinet 1006, shown in Fig. 10, having front closure doors 1007 and 1008, a panel 1009 on which are mounted an oscilloscope and controls therefor and a control panel 1010. The sides of the cabinet 1006 are provided with ventilation slots 1011 and with cable jacks, such as 1012, by which the cabinet may be connected by plug-ended cables 1013 with the instructor's apparatus cabinet 1000 and with other students' cabinets similar to cabinet 1006.

The generator, disclosed in Figs. 1 to 7, comprises a housing 1 which encloses and supports various elements of the mechanism. Essentially this device consists of a movable member or tracing head 2 which is capable of being driven along any one of a large multiplicity of paths within the housing 1 to represent on a small scale the imaginary airplane moving along the simulated course in space. As will be explained presently, the tracing head 2 is driven by an electric motor from one end of its course to the other within the housing 1, and the location of its course in terms of range, elevation angle, and azimuth angle is determined by the setting which the instructor gives the mechanism.

The course tracing head 2 is slidably supported on the horizontal guide rods 3 and 4. The length of the rods 3 and 4 corresponds to the length of the course, and the tracing head 2 is driven from one end of the rods to the other by means of a screw shaft 5 which engages a threaded opening in the head 2. The guide rods 3 and 4 and the screw 5 are supported on a carriage 6 which is arranged for sliding movement on the vertical guide rods 7 and 8. The vertical guide rods 7 and 8 are secured to the parallel bars 9 and 10 and together therewith form a frame which is capable of horizontal movement within the housing 1. To this end the upper bar 9 of the frame is slidably supported on the rods 11 and 12 and the lower bar 10 of the frame is similarly supported on the rods 13 and 14. The rods 11, 12, 13 and 14 are secured to the front and back plates of the housing 1.

The frame 7, 8, 9, 10 which supports the carriage 6 is adjustable on the guide rods 11, 12, 13 and 14 to bring the tracing head 2 into any desired vertical plane by means of a threaded shaft 15 which engages a tapped hole in the lower frame member 10. Shaft 15 is operated by a hand-wheel 16 located on the front side of the housing, and the instructor by adjusting this hand-wheel moves the entire frame 7, 8, 9, 10 to the desired position within the housing 1.

The instructor is also able to adjust the tracing head 2 to occupy any desired horizontal position within the housing. He accomplishes this adjustment by means of a second hand-wheel 17 which rotates the shaft 18 and, through the beveled gears 19 and 20, the threaded shaft 21. The shaft 21 is journaled for rotation in the frame members 9 and 10 and engages a threaded hole passing through the integral lug member 22 on the carriage 6. Thus, the rotation of the instructor's hand-wheel 17 causes the movement of the carriage 6 up or down as the case may be on the guide rods 7 and 8 until the tracing head 2 is positioned in the desired horizontal plane. It will be noted that the shaft 18 carries a number of splines 24 engaging recesses in the beveled gear 19 to permit the sliding movement of this gear along the shaft in response to movement of the frame 7, 8, 9, 10. The beveled gear 19 is held constantly in engagement with the gear 20 in all positions on the shaft 18 by means of coil spring 23. Alternatively the gears 19 and 20 may be enclosed in a housing which moves with the frame member 10. As the frame member 10 moves along the guide rods 13 and 14, the sliding gear 19 moves correspondingly along the shaft 18, and the spring 23 compresses or expands according to the direction of the movement.

The tracing head 2 is driven from one end to the other of the carriage 6 by means of a motor 25 which is supported on the carriage for movement therewith. The driving connection between the motor and the tracing head 2 consists of a worm-gear 26 on the motor shaft and a cooperating pinion 27 secured to the threaded shaft 5. The worm-gear and pinion are located within a housing 28 which may be integral or otherwise secured to the carriage 6. By mounting the motor 25 in this manner it is possible to drive the tracing head 2 in either direction along the guide rods 3 and 4 by choosing the corresponding direction of rotation for the motor regardless of the position of the frame 7, 8, 9, 10 in the housing 1 or the position of the carriage 6 on the frame.

It will now be seen that the tracing head 2 in its movement from one end of the carriage 6 to the other is capable of generating within the relatively small volume of the housing 1 a multiplicity of courses, each of which on a small scale is a facsimile of an imaginary course in space which might be traversed by an airplane flying over a distance of 50,000 yards. Moreover, it will be seen that the position of the frame 7, 8, 9, 10 and the position of the carriage 6 determine with respect to a given point of reference the instant values of the range, azimuth angle, and elevation angle of the tracing head 2 and similarly the instant values of these dimensions for the imaginary airplane flying in space.

Since it is convenient to represent the range, azimuth angle, and elevation angle in terms of electrical quantities, the movement of the tracing head 2 may be utilized to operate variable resistors or condensers to establish potentials or charges or similar electrical quantities that vary in accordance with the varying values of the range and angular dimensions. To this end the tracing head 2 is connected through a universal joint (Fig. 4) to the toothed bar or rack 29. The universal joint is obtained by means of a block 30 which is mounted on the head 2 for rotation in a horizontal plane about the vertical pivot pin 31 and to which the inner or end of the bar 29 is pivoted for rotation about the horizontal pivot pin 32. The outer or free end of the rack 29 operates the electrical devices 33, 34 and 35 which, as above noted, may be either variable resistors or variable condensers. The device 33 represents the range, the device 34 the azimuth angle, and the device 35 the elevation angle, and it will be assumed for the purpose of description that all three of these devices are available condensers, each having a stator and a rotor. The elevation condenser 35 is mounted on top of a disc 37 which may be called the azimuth table, and the condenser 34 is mounted beneath said table. The range condenser 33 is secured to the bracket 40, one arm of which is supported for rotation on the bearing member 55, and the other arm of which is secured to and serves to turn the rotor shaft of condenser 35.

The teeth on the rack 29 engage a pinion 36 which, in turn, is secured to the rotor of the range condenser 33. Movement, therefore, of the head 2 with respect to the center of the table 37 causes a corresponding longitudinal movement of the rack 29, which rotates the condenser 33 to vary the capacitance of the condenser in accordance with the rate of change of range of the head 2 with respect to the center line of the table. The rack 29 is held in mesh with the pinion 36 by means of rollers 38 and 39 secured to the bracket 40 and which bear against the upper smooth surface of the rack. Also, the rack 29 plays between the side plates of the U-shaped guide 41.

Since the guide 41 is secured to the table 37, the swinging motion of the rack 29, due to the movement of the tracing head 2, is translated into a corresponding rotary movement of the azimuth table 37. The table 37 is secured to the shaft 42 which, in turn, is supported for rotation upon the supporting bracket 43. The rotor of the condenser 34 is secured to the shaft 42; and the stator, a relatively fixed member of the condenser, is mounted on a shaft 44 which is arranged for an adjustable movement through the medium of beveled gears 45 and 46, shaft 47 and the hand-wheel 48. Thus, the movement of the tracing head 2 along the carriage 6 rotates the azimuth table 37, which in turn rotates the condenser 34 to vary the capacitance thereof in accordance with the changing azimuth angle of the head 2.

As noted above, the rotor of the elevation condenser 35 is secured to one arm of the swinging bracket 40, the other arm of which is pivotally supported on a bracket 55 mounted on the table 37. When, therefore, the tracing head 2 is moved in a vertical direction under control of the hand-wheel 17, the resulting movement of the rack 29, acting through the idlers 38 and 39, swings the bracket 40 and rotates the condenser 35 to vary the capacitance thereof in accordance with the changing elevation angle.

Assume that the tracing head 2, following the last previous use, is at rest at the extreme right-hand end of the carriage 6 (Fig. 1) and that the instructor wishes to simulate an imaginary course in space corresponding to the line GH in Fig. 9, the flight distance of which is 50,000 yards. First he adjusts the hand-wheel 16, which may have suitable calibrations thereon, to move the frame 7, 8, 9, 10 horizontally within the housing 1 until its distance from the center of the azimuth table 37 corresponds to the passing distance ON of the imaginary course GH from the point of observation O. This adjustment of the tracing head 2 determines the starting azimuth angle $\alpha_1$ and also the starting range OG. Next the instructor operates his hand-wheel 17, which also has suitable calibrations thereon, to move the carriage 6 in a vertical direction until the tracing head 2 occupies the desired position in elevation. Finally, the instructor adjusts a suitable resistor 49 (Fig. 8) and closes the reversing switch 50 to operate the motor 25 in the proper direction for driving the head 2 from the right-hand end of the carriage 6 to the left-hand end thereof. The resistor 49 determines the speed of the motor 25 and correspondingly the speed of flight of the imaginary airplane. As the tracing head 2 moves from the right-hand end of the carriage 6 toward the middle thereof, the rack 29 rotates the condenser 33 at a decreasing rate corresponding to the decreasing rate of change of range, and the azimuth table 37 rotates in the direction corresponding to the increase of the azimuth angle from the value $\alpha_1$ to 90 degrees. As the tracing head 2 passes the mid-point and moves on toward the terminating end of the course, the rack 29 rotates the condenser 33 at an increasing rate corresponding to the increasing rate of change of range, and the table 37 continues to rotate in the same direction corresponding to the increasing value of the azimuth angle from 90 degrees toward the final value of 180 degrees minus $\alpha_1$.

Figure 8:
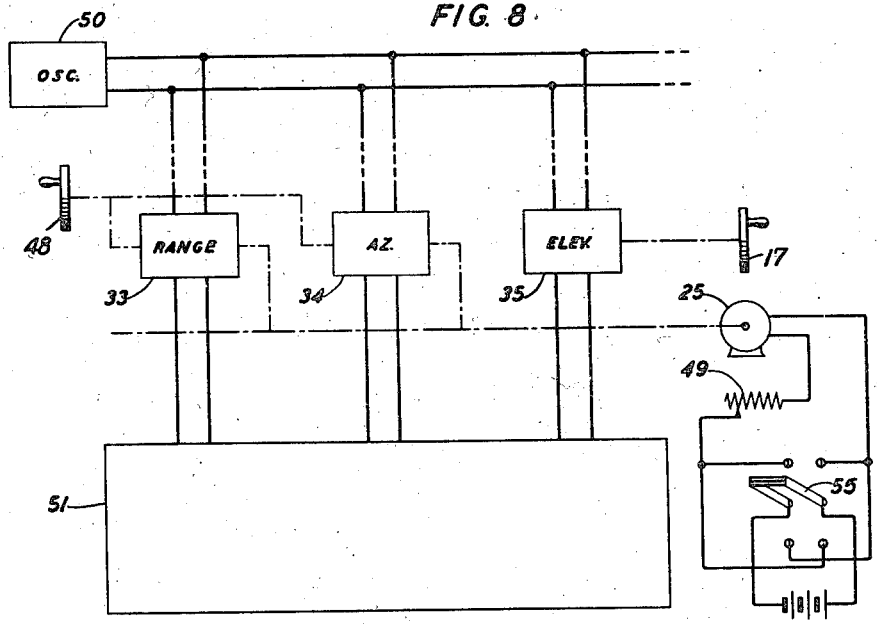
Fig. 8 is a circuit diagram.

Referring now to Fig. 8, it may be assumed that alternating waves derived from a base source of frequency 50 are applied to the range, azimuth and elevation condensers 33, 34 and 35, and that these condensers in their movement under the control of the course tracing head 2 produce phase changes in the applied waves which represent the range and angular dimensions. These waves, after undergoing the representative changes of phase, are then utilized by any suitable mechanism 51 such as the sweep circuits which apply potential to the horizontal deflection plates of an oscilloscope to produce a trace representative of the range of a moving object, the notch forming circuit for applying potential to one of the vertical deflection plates of the oscilloscope and the range mark producing circuits for applying potential to the other vertical deflection plate of the oscilloscope, to produce the necessary images on an oscilloscope by means of which the student tests his skill in the art of locating moving objects. For a general understanding of a system of this character, reference is made to the copending application of Andrews and Cesareo, Serial No. 513,042, filed December 6, 1943, and to the copending application of Cesareo, Serial No. 513,043, filed December 6, 1943.

When it is desired to generate a course in the opposite direction, such as the course HG (Fig. 9), the instructor, having made the proper setting of the generator, closes the reversing switch 55 to drive the motor 25 in the direction suitable for moving the tracing head 2 from the left-hand end of the carriage 6 toward the right-hand end thereof.

It will be understood that suitable mechanical devices may be provided for opening the circuit of motor 25 when the driving head 2 reaches either one of its extreme positions.

If the instructor wishes to generate a course other than one of the straight line courses EF, GH, etc., he may do so by manipulating the hand-wheel 16 during the time the tracing head 2 is moving along the carriage 6. Also, the instructor may vary the elevation during the generation of the course by manipulating the hand-wheel 17. Furthermore, he may operate the resistor 49 while the generator is in motion to vary the speed of flight.

Also, an independent adjustment in the value of the azimuth angle may be effected by the instructor's hand-wheel 48 which controls the rotary position of the condenser-stator.

It was mentioned hereinbefore that the electrical devices 33, 34 and 35 may be variable resistors if desired. One suitable construction for a variable resistor is disclosed in Fig. 7. It consists of a stationary element 52 and a rotating brush 53 which is driven by the shaft 54.

While the invention is described particularly in connection with the generation of courses corresponding to imaginary courses in space, it should be understood that the varying electrical quantities produced by the generator may represent the courses of real objects moving in space.

What is claimed is:

1. In a mechanism for simulating courses of movement of an object in space, said object being related to a reference point by a dimension which varies in magnitude, the combination of a driving shaft, a movable element associated with said shaft, means for operating said shaft for driving said element along a path to generate courses which simulate the courses of said object, means for translating said movable element to any desired position to select any desired course, means controlled by said movable element for varying an electrical quantity to represent the variation in said dimension caused by the movement of the object along said selected course, and means for utilizing said varying electrical quantity.

2. In a mechanism for simulating courses of movement of an object in space, said object having an angular dimension relative to a reference point which varies during its movement through each of the simulated courses, the combination of a driving shaft, a movable element on said shaft, means for operating said shaft for driving said element along the length thereof to generate courses which simulate the courses of said object, means for translating said shaft to any desired position for controlling the variation of said angular dimension, means controlled by said movable element for varying an electrical quantity to represent the variation in said angular dimension, and means for utilizing said varying electrical quantity.

3. In a mechanism for simulating courses of movement of an imaginary object in space, said object being related to a reference point by a dimension which varies in magnitude, the combination of a driving shaft, a movable element mounted on said shaft, means for operating said shaft for driving said element along the length thereof to generate courses which simulate the courses of said imaginary object, means for translating said shaft to any desired position in a given plane to preselect a desired course, means controlled by said movable element for varying an electrical quantity to represent the variation in said dimension caused by the movement of the imaginary object along said preselected course, and means for utilizing said varying electrical quantity.

4. In a mechanism for simulating courses of movement of an imaginary object in space, said object being related to a reference point by a dimension which varies in magnitude, the combination of a driving shaft, a movable element associated with said shaft, means for operating said shaft for driving said element to generate courses which simulate the courses of said imaginary object, means for translating said shaft to any desired position in a given plane to preselect a course in which said dimension has a desired rate of change, means controlled by said movable element for varying an electrical quantity to represent the variation in said dimension caused by the movement of the imaginary object along said preselected course, and means for utilizing said varying electrical quantity.

5. In a mechanism for simulating courses of movement of an imaginary object in space, the range of said object with respect to a point of reference varying in value for the various positions occupied in each of the courses simulated, the combination of a driving shaft, a movable element mounted on said shaft, means for operating said shaft for driving said element along the length thereof to generate courses which simulate the courses of said imaginary object, means for translating said shaft to any desired position in a given plane to select a desired course, means controlled by said movable element for varying an electrical quantity to represent the varying values of the range caused by the movement of the imaginary object along said selected course, and means for utilizing said varying electrical quantity.

6. In a mechanism for simulating courses of movement of an imaginary object in space, said object being related to a reference point by a dimension which varies in magnitude, the combination of a driving shaft, a movable element mounted on said shaft, means for operating said shaft for driving said element along the length thereof to generate courses which simulate the courses of said imaginary object, means for translating said shaft in either of two coordinate directions to select any desired course, means controlled by said movable element for varying an electrical quantity to represent the variation in said dimension caused by the movement of the imaginary object along said selected course, and means for utilizing said varying electrical quantity.

7. In a course generating mechanism for simulating courses of movement of an object in space, said object being related to a point of observation by a dimension which varies in value with the movement of the object, the combination of a driving shaft, a movable element on said shaft, means for operating the shaft for driving said element along the length thereof to generate courses which simulate said courses in space, means for translating said shaft in each of two coordinate directions to select any desired course, means controlled by said movable element for varying an electrical quantity to represent the variation in said dimension caused by the movement of the object along said selected course, and means for utilizing said varying electrical quantity.

8. In a mechanism for simulating courses of movement of an object in space, the range, azimuth angle and elevation angle of said object with respect to a point of observation varying with the movement of the object along its course, the combination of a driving shaft, a movable element, means for operating said shaft for driving said element along a path to generate courses which simulate the courses of said object in space, means for translating said movable element to preselect a course having a desired rate of change of range, azimuth angle and elevation angle, means controlled by said movable element for varying electrical quantities to represent the variations of range, azimuth angle and elevation angle caused by the movement of said object along the preselected course in space, and means for utilizing said varying electrical quantities.

9. In a mechanism for simulating courses of movement of an imaginary object in space, said object being related to a reference point by a dimension which varies in magnitude, the combination of a driving shaft, a movable element mounted on said shaft, means for operating said shaft to drive said element in either direction to generate courses simulating courses of movement of said imaginary object in the corresponding direction, means for translating said shaft to any desired position to select any desired course, means controlled by said movable element for varying an electrical quantity to represent the variation in said dimension caused by the movement of the imaginary object along said selected course, and means for utilizing said varying electrical quantity.

10. In a mechanism for simulating courses of movement of an imaginary object in space, said object being related to a reference point by a dimension which varies in magnitude, the combination of a driving shaft, a movable element mounted on said shaft, a reversible motor for operating said shaft to drive said element in either direction to generate courses simulating courses of movement of said object in the corresponding direction, means for translating said shaft to any desired position to select any desired course, means controlled by said movable element for varying an electrical quantity to represent the variation in said dimension caused by the movement of the imaginary object along said selected course, and means for utilizing said varying electrical quantity.

11. In a mechanism for simulating courses of movement of an imaginary object in space, said object being related to a reference point by a dimension which varies in magnitude, the combination of a driving shaft, a movable element mounted on said shaft, a reversible motor for operating said shaft to drive said element in either direction to generate courses simulating courses of movement of said object in the corresponding direction, and means for varying the speed of said motor to simulate the speed of movement of said object in space, means for translating said shaft to any desired position to select any desired course, means controlled by said movable element for varying an electrical quantity to represent the variation in said dimension caused by the movement of the imaginary object along said selected course, and means for utilizing said varying electrical quantity.

THADDEUS C. CAMPBELL.

REFERENCES CITED

The following references are of record in the file of this patent:

UNITED STATES PATENTS

| Number | Name | Date |
| --- | --- | --- |
| 2,321,799 | Cone | June 15, 1943 |
| 1,939,706 | Karnes | Dec. 18, 1933 |